United States Patent [19]

Clarke

[11] 4,423,618

[45] Jan. 3, 1984

[54] REHARDENING OF COPPER CONNECTORS

[75] Inventor: John P. Clarke, DeSoto, Tex.

[73] Assignee: Virginia Chemicals Inc., Portsmouth, Va.

[21] Appl. No.: 302,098

[22] Filed: Sep. 14, 1981

[51] Int. Cl.$^3$ ............................................. B21D 41/02
[52] U.S. Cl. ...................................... 72/370; 228/155
[58] Field of Search ................... 72/370; 29/DIG. 49; 228/155, 156; 285/382.4

[56] References Cited

U.S. PATENT DOCUMENTS

| | | | |
|---|---|---|---|
| 2,174,967 | 10/1939 | Cartwright | 72/370 |
| 2,197,609 | 4/1940 | Cornell, Jr. | 228/155 |
| 4,049,185 | 9/1977 | Nippert | 228/155 |

*Primary Examiner*—Lowell A. Larson
*Attorney, Agent, or Firm*—Depaoli & O'Brien

[57] ABSTRACT

A method is described for manufacturing, shipping, and handling a process component of heat-exchanging, air-conditioning, and refrigerating circuits, such as a filter drier or an accumulator, so that the process component can be joined to fluid tubing of such circuits by field brazing, using phosphorus-bearing copper filler metal with little or no silver content to make the braze joints. The method finally comprises the steps of selecting the tubing used for the connectors with a diameter which is smaller than the diameter needed for the field brazing to the circuit tubing and then mechanically expanding the other end of the tubing from 2% to 20% to this field brazing diameter, whereby the tubing is work-hardened to a hardness of 45–50 F Scale Rockwell and is able to withstand damage from shipping and handling operations and thereby returns the critical tolerances needed by the field brazing. However, mechanical expansion is restricted to a maximum of 6% if it is desired to avoid an orange peel surface on the connector. Mechanical expansion is done by punching in one to four steps, each punch increasing the diameter of the tubing by 0.005 to 0.010 inch.

7 Claims, No Drawings

REHARDENING OF COPPER CONNECTORS

BACKGROUND OF THE INVENTION

1. Field of the Invention

This invention relates to tubing and particularly relates to copper tubing. It specifically relates to methods for hardening small sections of annealed copper tubing in order to protect the tubing from damage before final usage.

2. Review of the Prior Art

Copper tubing is usually formed by extrusion and is generally shipped in its annealed state so that it is easily bent and installed, as described for example, in U.S. Pat. No. 3,774,431. However, when small sections of tubing are processed for usage as connectors in fluid conduits, it is often of considerable practical importance that the original characteristics, such as roundness and diameter, of the tubing be maintained at exposed ends thereof. Such a situation frequently occurs when the metal in these small sections is joined to a process component by brazing which requires temperatures above 1000° F., whereby annealing of a metal of the connector is likely to occur.

The manufacturer of the process component generally completes his assembly by attaching one or more of these connectors if the component is constructed of a different metal than the metal of the tubing, because brazing of dissimilar metals in the field is difficult and relatively expensive. This situation is particularly apt to occur if: (1) the tubing is made of copper which is very soft in its fully annealed stage, whereby its exposed ends are difficult to handle without damage during shipment and other phases of handling, and (2) the sections are to be joined to other portions of fluid tubing or to other components of a circuit by brazing, because the tolerances in brazed joints are rather critical in order to provide the proper capillary action which causes the filler metal to flow into the proper joint. Moreover, for copper tubing, there are economic advantages to the installer in that he is able to use phosphorous-bearing copper filler metal with little or no silver content to make the brazed joint.

It is well known that annealing increases grain size and softens many metals. Heating and then quenching a metal have long been used for increasing hardness, and these steps may be followed by a rolling operation, as disclosed in U.S. Pat. No. 1,446,332 for bronzes.

Heating of a heat hardenable copper alloy to its solution annealing temperature, working the heated alloy to a selected semi-finished cross section, and immediately thereafter quenching the alloy in its worked form to obtain a fine-grained structure is described in U.S. Pat. No. 3,717,511.

Forming a high-strength, joined aluminum-bronze alloy article, for use in heat exchangers and automotive radiators, by brazing at 1500° F. (above the melting point of the filler metal but below the melting point of the alloy) produces a tensile strength greater than 100,000 psi, a grain size of less than 0.065 milimeters in diameter, and a desired proportion of $\alpha/\beta$ phases, according to U.S. Pat. No. 3,292,132, in which it is stated that the prior art brazing procedure fully softens conventional copper-based alloys for which re-hardening is stated to be impractical.

A thermal treatment comprising sequential steps of partial homogenizing, discontinuous aging, and complete homogenizing of copper-rich Cu-Ni-Sn alloys, which are held at a prescribed temperature level for a prescribed time period during each step, is disclosed in U.S. Pat. No. 4,142,918 in order to produce an alloy having good fracture toughness.

A hard Cu-Zn alloy (61–65 weight percent Cu), which is suitable for repeated cold working and annealing, is produced by casting, annealing to remove all beta phase structure, cold working with at least 70% deformation, and annealing at 275° C., as taught in U.S. Pat. No. 4,238,249.

Although these methods are capable of increasing hardness of Cu alloys after annealing, it is evident that careful attention must be paid to time and temperature of treatment in order to obtain a selected grain structure and size. But such procedures are impractical when small sections of copper tubing, such as connectors, need hardening of their exposed ends, particularly after brazing to a dissimilar metal which is part of another device to be attached to the copper tubing of a fluid conduit circuit. Clearly, the size, delicacy, and/or awkwardness of such devices tends to inhibit cold rolling and similar manipulative steps used in the prior art.

There is therefore a need for a method of increasing the hardness of small sections of tubing which are in the annealed state, and there is specifically a need for increasing the hardness of connectors which have been joined to other metals by oven brazing, particularly when the other metals form parts of various devices.

SUMMARY OF THE INVENTION

It is therefore an object of this invention to provide a method for increasing the hardness of small sections of tubing at least one end thereof.

It is also an object to provide a method for hardening one end of a section of copper tubing which has been joined at its other end to a dissimilar metal and fully annealed by oven brazing, whereby the section is resistant to damage during shipment and handling and is able to retain its finished diameter and roundness.

In accordance with these objectives and the principles of this invention, a method is hereby provided that imparts a protective amount of hardness to an annealed section of tubing and thereby enables an exposed end thereof, having a finished diameter and roundness, to be resistant to damage during shipping and handling. This method comprises the following steps:

A. selecting the tubing with a diameter which is smaller than the final usage diameter; and B. mechanically expanding the section of tubing to the final usage diameter, whereby the tubing is work-hardened to a selected extent.

When the tubing is copper tubing for use as a fluid conduit, as in heat-exchangers, automotive radiators, and air-conditioning and refrigeration circuits, the mechanical expansion step increases the diameter from two percent to 8 percent. This mechanical expansion is preferably no greater than six percent when avoiding an orange peel surface on the copper tubing.

This method is particularly effective when the copper tubing has been fully annealed at elevated temperatures that are significantly higher than the optimum annealing temperature. Such fully annealed copper tubing has a hardness of 2–10 F Scale Rockwell. After work-hardening, the copper tubing has a hardness of 45–50 F Scale Rockwell. Such elevated temperatures occur during furnace brazing of the copper tubing to dissimilar metals. Typically, the copper tubing is a small section known as a connector and the dissimilar metal is a steel part of air conditioning or refrigeration equipment but may be a part of any other accessory or portion of other circuits, such as automotive radiators, heating and cooling circuits, or heat exchanger circuits. The final usage includes brazing of the work-hardened connector to fluid conduit tubing in air conditioning and refrigeration circuits and other circuits.

Mechanical expansion of the exposed ends of connectors is suitably done by punching, in one or more steps. If done in four steps, each punch typically increases the size of the tubing or connector by 0.005–0.010 inch. The final punch sizes the connector to the desired diameter.

DESCRIPTION OF THE PREFERRED EMBODIMENT

It is industrially preferred at the present time that manufacturers of filter driers, accumulators, and other components of air conditioning and refrigeration circuits having copper tube fluid conduits provide their products with copper end connections, whereby the installer can more easily solder or braze the copper-to-copper joint than he could if dissimilar metals were to be joined in the field. Moreover, the installer can use less expensive phosphorous-bearing copper filler metal with little or no silver content to make the brazed joint, as compared to the filler needed for conjoining dissimilar metals.

Manufacturers consequently braze a short copper tube section, known as a connector, to the inlets and outlets of filter driers, accumulators, and similar process components of air conditioning and refrigeration circuits within a furnace. After doing so, the fully annealed connector is very soft and difficult to handle without damage. If damaged, the brazing operation by the installer can be very difficult because the tolerances in brazed joints are rather critical in order to provide the proper capillary action which causes the filler metal to flow into the joint. Therefore, it becomes important that the connector resists deformation, especially with respect to diameter and roundness.

It has therefore surprisingly been discovered that if the connector is selected with a diameter which is slightly less than the finished diameter, the fully annealed connector can be work hardened sufficiently after furnace brazing to resist damage due to normal handling by simply expanding the connector mechanically, even though it remains attached to the accessory device or part thereof. Such expansion can be accomplished by a single punch or by a series of punches, such as by four punches. The amount of expansion varies from two percent to six percent if an orange peel appearance to the connector is to be avoided. Each punch increases the size of the connector by 0.005–0.010 inch. The final punch sizes the connector to the desired diameter.

The connector hardness after furnace brazing typically ranges from 0–10 F Scale Rockwell. After work-hardening, the range is 45–50 F Scale Rockwell.

During the brazing process in the furnace, considerable grain growth occurs in the copper. If the subsequent expansion by punching is too great, the orange peel surface then appears. By carefully controlling the before and after dimensions of the connector, the desired increase in hardness can be obtained while avoiding degradation of the appearance of the copper surface. However, if the appearance of the surface of the connector is not important, additional expansion by as much as 20% is feasible.

While the foregoing embodiments are considered to be preferred, it is to be understood that numerous variations and modifications may be made in the method of this invention by those skilled in the art, and it is intended to cover in the appended claims all such variations and modifications as being within the true principles and scope of the invention.

What is claimed is:

1. A method for enabling a process component of heat-exchanging, air-conditioning, and refrigerating circuits to be joined to fluid conduit tubing of said circuits by field brazing, using phosphorus-bearing copper filler metal with little or no silver content to make the brazed joints, by imparting a protective amount of hardness to exposed ends of fully annealed small sections of copper tubing which have a roundness and diameter needed for said brazed joints and are used as connectors, each said connector having one end joined to a dissimilar metal of said process component by furnace brazing so that said copper tubing has been fully annealed, at an elevated temperature that is significantly higher than optimum annealing temperatures, to a hardness of 2–10 F Scale Rockwell, said method comprising the following steps:
   A. selecting said tubing with a diameter which is smaller than the field brazing diameter needed for making said brazed joints; and
   B. mechanically expanding said exposed ends of said tubing from two percent to twenty percent in diameter to said field brazing diameter, whereby said tubing is work-hardened to a hardness of 45–50 F Scale Rockwell, whereby said tubing is resistant to damage during shipping and handling before said field brazing is performed and is able to retain the critical tolerances needed for said field brazing.

2. The method of claim 1, wherein said mechanical expansion is no greater than six percent while avoiding an orange peel surface on said copper tubing.

3. The method of claim 1, wherein said dissimilar metal is steel.

4. The method of claim 1, wherein said mechanical expansion is done by punching in one to four steps.

5. The method of claim 4, wherein said mechanical expansion is done in four steps and each punch increases the diameter of said tubing by 0.005–0.010 inch.

6. The method of claim 3, wherein said process component is a filter drier.

7. The method of claim 3, wherein said process component is an accumulator.

* * * * *